United States Patent [19]
Waldron et al.

[11] Patent Number: 5,387,787
[45] Date of Patent: Feb. 7, 1995

[54] SCANNING DEVICE FOR RECONSTRUCTING A COMPLETE CODE FROM SCANNED SEGMENTS

[75] Inventors: James R. Waldron, Oviedo; Daniel A. Kenney, Daytona Beach, both of Fla.

[73] Assignee: LazerData Corporation, Sanford, Fla.

[21] Appl. No.: 165,027

[22] Filed: Dec. 9, 1993

Related U.S. Application Data

[63] Continuation-in-part of Ser. No. 944,506, Sep. 14, 1992, Pat. No. 5,296,691.

[51] Int. Cl.⁶ ............................................. G06K 7/10
[52] U.S. Cl. ..................................... 235/462; 235/463; 235/467
[58] Field of Search ...................... 235/462, 463, 467

[56] References Cited

U.S. PATENT DOCUMENTS

| | | |
|---|---|---|
| 3,701,097 | 10/1972 | Wolff . |
| 3,891,831 | 6/1975 | Coles, Jr. . |
| 3,909,787 | 9/1975 | Laurer et al. . |
| 3,916,158 | 10/1975 | Sansone et al. . |
| 3,995,166 | 11/1976 | Hobart et al. . |
| 4,056,710 | 11/1977 | Shepardson et al. . |
| 4,092,632 | 5/1978 | Agulnek . |
| 4,093,865 | 6/1978 | Nickl . |
| 4,289,957 | 9/1981 | Neyroud et al. . |
| 4,308,455 | 12/1981 | Bullis et al. . |
| 4,329,574 | 5/1982 | Jordan, Jr. . |
| 4,409,469 | 10/1983 | Yasuda et al. . |
| 4,488,678 | 12/1984 | Hara et al. . |
| 4,717,818 | 1/1988 | Broockman et al. . |
| 4,745,484 | 5/1988 | Drexler et al. . |
| 4,973,829 | 11/1990 | Ishida et al. . |
| 5,028,772 | 7/1991 | Lapinski et al. . |
| 5,045,677 | 9/1991 | Okamura . |
| 5,124,538 | 6/1992 | Lapinski et al. . |
| 5,926,691 | 3/1994 | Waldron et al. .............. 235/462 |

*Primary Examiner*—Harold Pitts
*Attorney, Agent, or Firm*—Lorusso & Loud

[57] ABSTRACT

This invention features both a device and method for reading machine readable code. The device includes a scanning apparatus, a signal processor and a data processor. The scanning apparatus scans the code and outputs a signal representative of at least a portion of the code. The signal processing means processes each of the signals outputted by the scanning means and further provides signal identification data, including a width and position associated with each of the signals, for each successive scan of the code. The data processing means reconstructs the code from the signal identification data for each successive scan of the code, provided by the signal processing means. The data processing means includes a position aligning means for both selecting an element in a previous scan and calculating the position of that element in a successive scan based upon a calculated offset, and means for aligning the successive scan with the previous scan by means of the calculated offset. The data processing means further includes an alignment verification means for verifying the alignment between the previous scan and the successive scan performed as a result of the means for aligning. The alignment verification means includes means for attempting a predetermined number of additional alignments between the previous scan and the successive scan when the previous scan and the successive scan are not aligned by the alignment verification means.

47 Claims, 12 Drawing Sheets

P = POSITION COUNT
F = BLACK/WHITE FLAG BIT
C = RAW TRANSITION COUNT

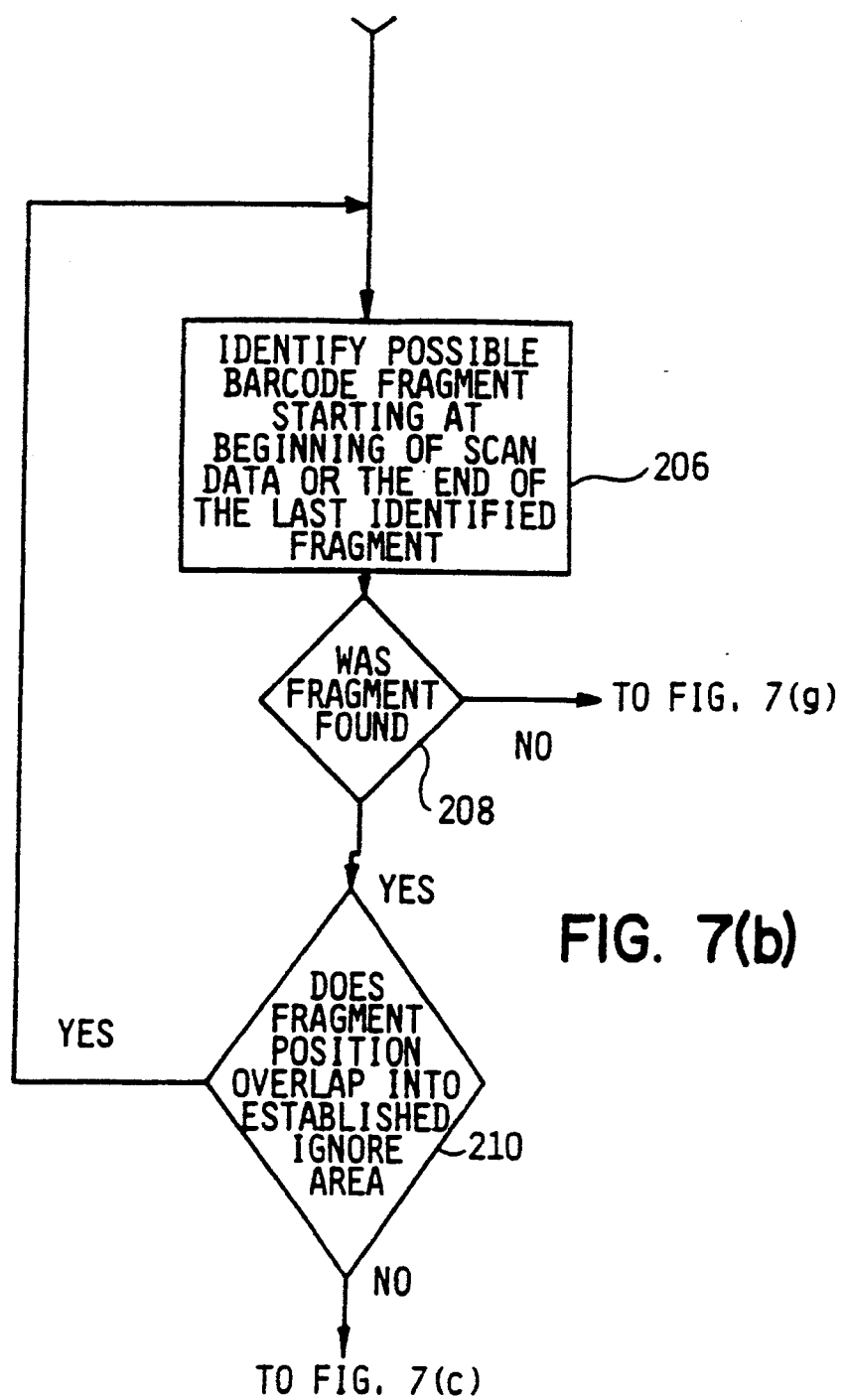

SCANNING DEVICE FOR RECONSTRUCTING A COMPLETE CODE FROM SCANNED SEGMENTS

CROSS REFERENCE TO RELATED APPLICATIONS

This is a continuation-in-part of copending application Ser. No. 07/944,506, filed Sep. 14, 1992, now U.S. Pat. No. 5,296,691, issued on Apr. 22, 1994.

FIELD OF INVENTION

This invention relates to devices for scanning bar codes and more particularly to omni-directional scanning devices which reconstruct a complete code by combining scanned code segments.

BACKGROUND OF THE INVENTION

Bar codes are used in a number of applications to uniquely identify an item or group of items. The bar code is typically a combination of black bars and white spaces representing the unique identification code and is affixed to the item in any of a number of ways (e.g., a label). The reading and decoding of a bar code can be used to yield additional information concerning the item, such as a description of the item and its price. The bar code has also been used for inventory control, manufacturing parts control, and employee identification. Failure to properly read the bar code usually requires manual intervention, such as manual entry of the data (e.g., the identification number represented by the bar code). Manual intervention, however, can cause problems because of human error as well as causing delays and increasing costs.

Bar code scanners are the devices used to read the bar code affixed to an item so the desired information can be retrieved. In the case of a supermarket, one example of this would be the price associated with goods. The scanner reads the bar code by detecting the light reflected from the bar code and determining the light contrasts between the bars, typically the dark or black areas, and the spaces, typically the light or white areas. In most scanners the code is illuminated by a beam of coherent light (i.e., a laser) that moves or sweeps across the bar code. A rotating wheel with a number of mirror facets is typically used to sweep the coherent light across the bar code.

There is shown in FIG. 1, a typical omni-directional overhead scanner 10 for detecting a bar code 22 affixed to package 12 traveling on a conveyer belt 14 in direction 20. The scanner 10 illuminates the package top surface, where the bar code 22 is located, with pattern 16 of coherent light. In this way, the scanner 10 can read a bar code 22 that approaches the scanner 10 in any orientation. In this illustration, the bar code 22 is read so the package 12 can be sorted and sent along different paths 18a–c.

For one scanning technique, the bar code is read by sweeping a beam of coherent light across the entire bar code. In actual practice redundant passes or sweeps are made across the entire bar code to assure a good reading of the bar code, however, no reconstruction of the bar code is done. The redundant scanning is done to address possible localized width inaccuracies (e.g., local void in bar). This method is best suited for reading bar codes which have been pre-positioned so the bar code extends along the scan line of the sweeping coherent line. This bar code orientation has also been referred to as a "picket fence" or "ladder" orientation.

However, it is not always possible to control the orientation of the bar code with respect to the scan line of the scanning device. There are two ways that the traditional method could be used to scan a bar code which is at an angle with respect to the coherent light scan line. The bar code may be scanned with many beams of coherent light at numerous angles with respect to the surface of the bar code. This approach, however, requires a great deal of expensive equipment to implement. Alternatively, the bar codes may be made very tall so practically speaking the scan line will see the entire bar code. This approach significantly increases the size of bar code (e.g., the bar code label).

Another technique to read a bar code, which is at an angle with respect to a coherent light scan line, involves reconstructing the entire bar code from fragments of the bar code. This technique is based on the principle that, as the bar code moves under and through the coherent light scan line, the entire bar code will eventually be seen by the scanner. The scanner, however, only scans a portion or fragment of the bar code at a time, saving each of the scanned fragments. After the bar code has passed through the scan line, the complete bar code is reconstructed by reconnecting the saved scanned fragments.

When reconstructing a bar code, there is an increased risk that the bar code will be mis-read because of the loss in redundancy. Redundancy is the repetitive measuring of the same bar code element (e.g., same bar) to assure that the correct element width is provided for decoding. For any given scan, it is possible for an incorrect width to be outputted because of printing problems (e.g., voids or blotches), errors in the scanning process, and/or from wear and tear on the bar code (e.g., bar code label).

Since repetitive scanning of the entire bar code is not possible for the reconstruction technique, redundancy is obtained at the individual bar and space level by utilizing width data from overlapping regions of code fragments. When fragments are properly aligned, redundant information is available to refine and correct width data for the bars and spaces in the overlap regions. For reconstructive methods, therefore, redundancy is dependent upon getting a correct fragment alignment.

One type of reconstructive technique involves aligning fragments by locating and matching a bar and space pattern, including the bar and space widths, that is common to the fragments. This specific technique will be referred to hereinafter has as "pattern matching." One common cause for fragment misalignment with the pattern matching technique is the presence of repetitive patterns of bar elements in a bar code. Because of repetitive patterns there can be a number of areas in the fragments which are common to each other. Thus, while the bar and space patterns of the fragments may match, the fragments may not be properly aligned because the wrong bar and space patterns are being used for alignment.

Misalignment can occur for a number of other reasons. Human readable printing about the bar code can produce false bars at one or both ends. Printing errors as well as wear and tear on the bar code label can cause a particular bar to appear much smaller or larger in one scan than it does in another.

If exact pattern matches are required, very few bar codes will be successfully rebuilt, and the read rate will be very low. Since an exact pattern match will not result most of the time, an arbitrary limit is typically established so that fragments are considered in alignment if at least some set number of bars and spaces match. However, if the limit is set too loose, while the number of matches will go up and the read rate will be high, the number of mis-reads will go up. In practice, a majority of the mis-reads can be filtered out by using fixed length bar codes and checksums.

Therefore, determining accurate bar and space widths for proper decoding depends on a proper alignment of the bar code fragment overlapping regions. However, the proper alignment of the overlapping regions in known methods depends upon matching the patterns of the fragments. This method assumes that the bars and spaces have the correct widths. In sum, reconstructing bar codes by using known methods for pattern matching balances the need for accurate bar and space widths for decoding with the need for a reasonable read rate.

Reconstructive bar code scanning devices and the associated methodology are disclosed in U.S. Pat. Nos. 4,289,957, 4,488,678, 4,717,818, 4,973,829, 5,028,772, and 5,124,538. The differences between the above referenced patents is the specific manner in which the fragments are combined to reconstruct a complete bar code for decoding.

In U.S. Pat. Nos. 4,289,957, and 4,717,818 the bar code contains markers representing the ends and middle of the bar code. The scanning device reconstructs the complete bar code based on the presence or existence of markers in the scanned segments. In U.S. Pat. No. 4,289,957, a bar fragment portion not located between two markers (e.g., end and middle) is ignored and the fragment portions that lie between the markers are combined.

In U.S. Pat. No. 4,488,678, the superfluous or duplicative data from the overlap between the bar code fragments is removed in one of two ways. If a bar code has separation bars, the data outside the separation bars is eliminated. If the bar code does not have separation bars, the number of bars indicated by the combined data is compared to the known number of bars for the particular bar code being scanned. If the number of bars for the combined data is greater than the known value, the superfluous or duplicative data is removed from either of the overlapping regions.

In U.S. Pat. Nos. 4,973,829, 5,028,772, and 5,124,538, a complete bar code is reconstructed by relatively shifting the stored data of two fragments until there is a pattern matching of the data (i.e., the bar/space patterns match). The data from the fragments is then combined based on this point of commonalty. The differences between these patents is the manner in which the width data is relatively shifted, the amount and type of matching required, and how the data is reconstructed.

In U.S. Pat. No. 4,973,829, the data from multiple passes is combined using a superimposition technique. In this method, the data in the master memory is shifted one address at a time until the master memory data fully coincides with the data from one of the passes stored in the transaction memory. The data from the transaction memory is then superimposed on the data in the master memory starting at the point of coincidence.

In U.S. Pat. No. 5,028,772, a bar code is scanned producing two incomplete bar code segments where one fragment provides the beginning of the code, the other fragment provides the end, and both provide an overlapping middle portion. The two bar code fragments are combined by relatively shifting the overlapping regions of the fragments until a registered or pattern matched middle portion results. Essentially, the device slides one fragment along the data previously acquired until a pattern of bars and spaces match up.

U.S. Pat. No. 5,124,538 (a continuation of '772) describes a methodology whereby a plurality of scanned fragments can be combined to reconstruct the entire bar code. In this technique, while taking data relating to bar and space widths, data is also accumulated concerning the position of certain data events with respect to the starting point of each scan. The transition (e.g., white to black) position count for a valid middle portion of the first fragment is recorded and a range $(+/-)$ is calculated. The second fragment is then analyzed to see if at least a portion of that fragment falls within the calculated range of the valid middle region of the first fragment. If it does not lie within the valid range, a fragment from a following scan is analyzed.

If the second fragment does fall within the calculated range, the valid middle region of the first fragment, the second fragment is shifted to each possible location within the calculated range. A pattern comparison is then made between the width data for each fragment at each possible location. Preferably, a bar/space pair is created by summing adjacent bars and spaces which are then used for pattern comparison purposes. If the pattern matches, then a registered middle portion of adjacent code fragments is identified or found.

Therefore, it is object of the present invention to provide a scanning device that avoids uncertainties inherent in the pattern matching alignment technique.

Another object of the present invention is to provide a scanning device that is more efficient and faster than prior art techniques.

It is a further object of the present invention to provide a scanning device that aligns scanned segments so that redundant information for each bar element scanned can be used to determine bar and space widths for decoding.

It is yet another object of the present invention to provide a scanning device that can reconstruct a complete bar code from scanned segments by calculating the positional change of a selected bar between scans.

It is yet a further object of the present invention to provide a scanning device that can align overlapping scanned code segments using the positional information of the selected bar.

It is still yet another object of the present invention to provide a scanning device that can be used for a number of applications including reading packages moving along high speed conveyers for data collection and/or sorting purposes.

SUMMARY OF THE INVENTION

This invention features both a device and method for reading machine readable code, having a plurality of code elements, on an object. The device includes a scanning means, a signal processing means and a data processing means. The scanning means successively scans the code and outputs a signal representative of at least a portion of the code, for each successive scan of the code. The signal processing means processes each of the signals outputted by the scanning means and further provides signal identification data, including a width and position associated with each of the signals, for each successive scan of the code.

The data processing means reconstructs the code from the signal identification data for each successive scan of the code, provided by the signal processing means. The data processing means includes a position aligning means for both determining the position of a selected code element for a successive scan and for positionally aligning the selected code element with the corresponding element from a prior scan.

In a preferred embodiment, the data processing means further includes combining and accumulating data means. The position aligning means of the data processing means further includes first and second position calculating means and offset averaging means. The first position calculating means calculates a positional difference between the position of a selected code element in the first scan and the position of the selected code element in the second scan to provide a calculated offset for use with the third scan. An alignment is subsequently performed for the first and second scans based upon the alignment of a leading edge or trailing edge of both the first and second scans.

When there has been at least three scans of the bar code, the second position calculating means calculates a positional difference between the position of a selected code element from the combining and accumulating means and the position of the selected code element from a successive scan of a portion of the code. The offset averaging means averages previously calculated offsets with the positional difference calculated by the second position calculating means to provide a refined calculated offset for use with successive scans.

The position aligning means also includes means for determining the expected position of the selected code element in the third and successive scans and means for locating a code element in the third and successive scans which most closely matches the expected position of the selected code element. The expected position is determined by applying the calculated offset from either the first position calculating means for the third scan or the offset averaging means for all other successive scans. Preferably, the code element selected is a bar which has been seen in at least two scans. The third and successive scans are subsequently aligned with the previous scans based upon the calculated offset or the refined calculated offset. An alignment verification is performed to ensure the alignment of the previous scan and the present scan. If, however, the alignment is not proper, additional alignments are attempted.

The data processing means may include means for positionally aligning signal identification data in the combining and accumulating means with the signal identification data of a successive scan; means for identifying width mismatches between aligned signal identification data; and means for retaining the signal identification data which has been identified as having width mismatches. The signal identification data is aligned based on the position of the selected code element in the combining and accumulating means and the code element that most closely matches the position of the selected code element in the successive scan. Also, the combining and accumulating means cooperates with the mismatch identifying means such that mismatched signal identification data is not combined and accumulated.

Mismatches are addressed by the mismatch resolving means which resolves the mismatches by comparing the width data from three scans of signal identification data. The first and third scans and the second and third scans of signal identification data are compared to determine which scan pair has consistent data. An indicating means is provided so that the signal identification data for the scans having consistent width data is combined in the combining and accumulating mean, and the data for the scan associated with the inconsistent data is ignored.

In addition, the data processing means includes identifying means for identifying a first area where signal identification data is to be accumulated and a second area where such data is not to be accumulated. Signal identification data is compared by first and second comparing means to determine if the data overlaps the first or second areas respectively. The second area may be an area containing machine readable code that is not to be decoded.

The scanning means may include at least one, or a plurality, of light source and sensing means. The light source and sensing means successively illuminates a machine readable code with a predetermined pattern of light and successively senses the light reflected from the code and may include a coherent light source. The scanning means may include a light directing means for directing the light from the coherent light source to create the predetermined pattern of light.

BRIEF DESCRIPTION OF THE DRAWINGS

FIGS. 7(a)-7(g) are flow charts of the sequence of operations for the microprocessor of the present invention;

DESCRIPTION OF THE PREFERRED EMBODIMENT

Figure 1:
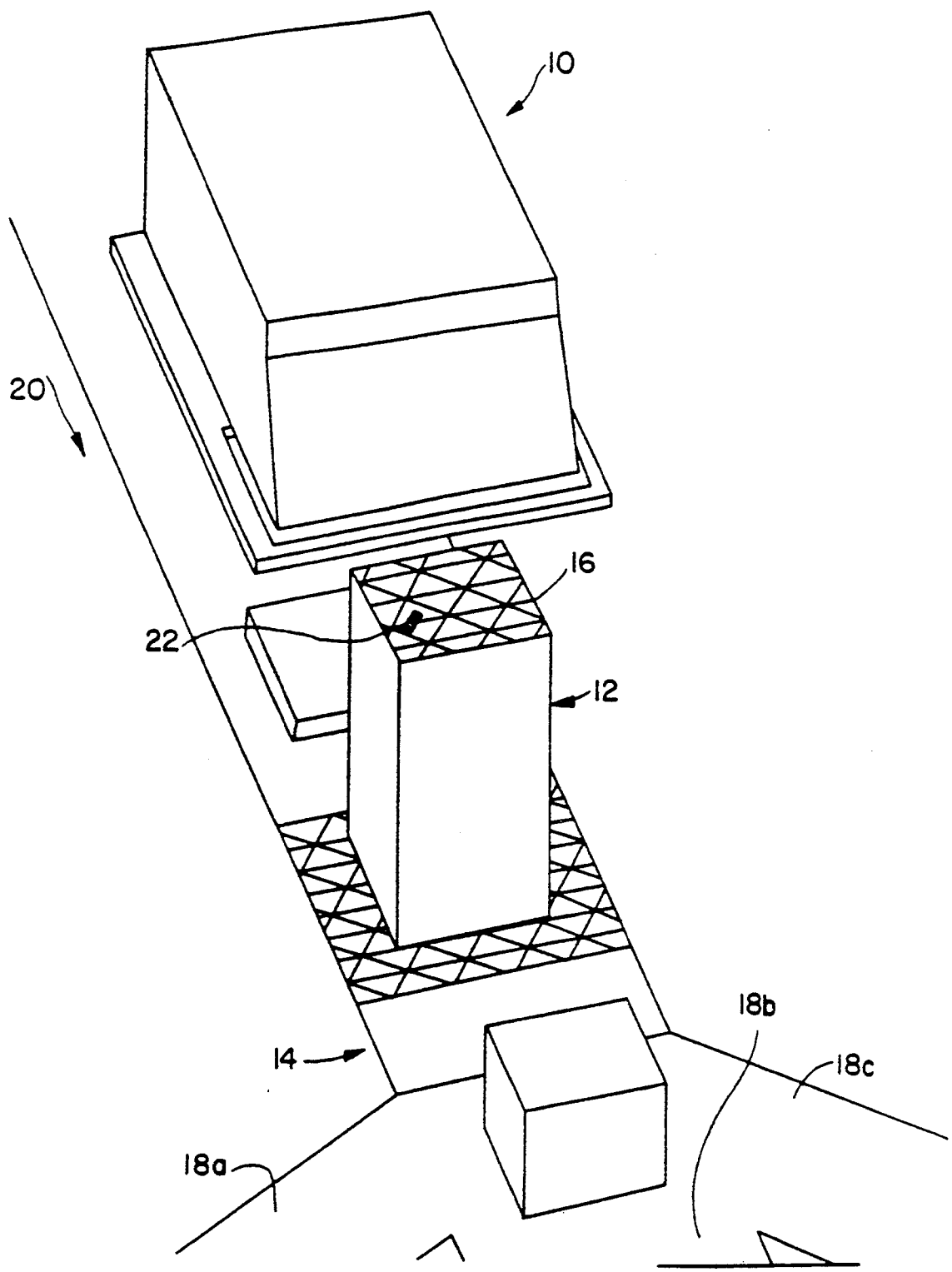
FIG. 1 is an elevation view of an overhead omnidirectional scanner as shown in the prior art.
Figure 2:
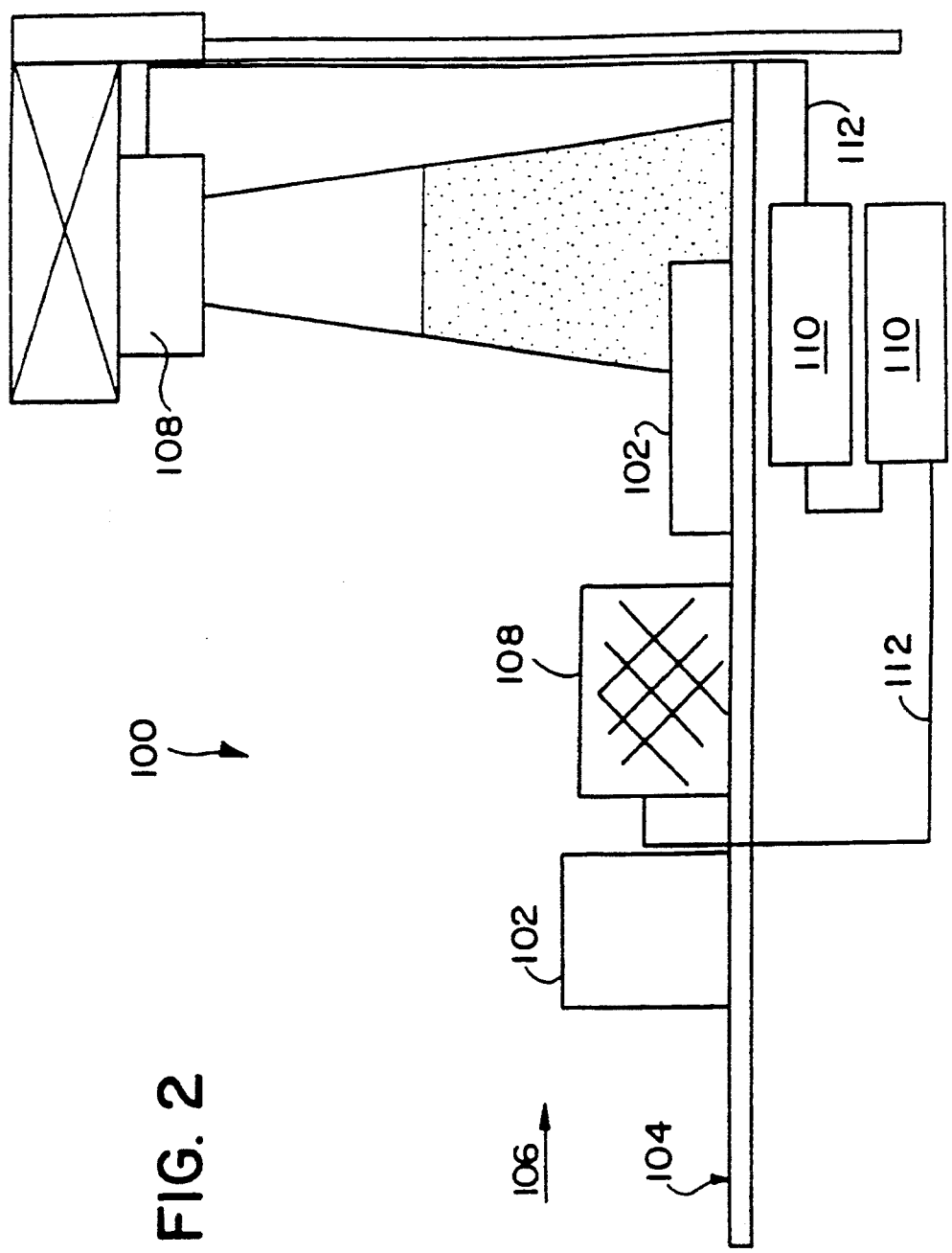
FIG. 2 is an elevation view of the scanner of the present invention in an overhead conveyer belt scanning application.

There is shown in FIG. 2, scanning device 100 illustrative of the present invention. One use of the scanning device is to scan for bar codes on boxes 102 traveling on a conveyer belt 104 moving in direction 106. The scanning device 100 includes an optics means 108 and an electronics means 110. The optics means 108 illuminates the moving boxes 102 with coherent light, senses the reflected light from the bar codes and provides an output signal representative of the reflected light along line 112 to the electronics package 110. Preferably, the output signal provided has been digitized using techniques well known in the art.

Also illustrated in FIG. 2, is another embodiment of the optics means of the present invention which includes an additional optic means 108 disposed to scan the side of a moving box 102. The optical means may be positioned about the travel path of the moving item to optimally detect a bar code affixed to any exposed surface of the item.

The electronics means 110 processes the optics means output signals and outputs a signal representative of the information encoded in each bar code scanned. Preferably, an electronics means 110 is provided for each optics means 108.

Figure 3:
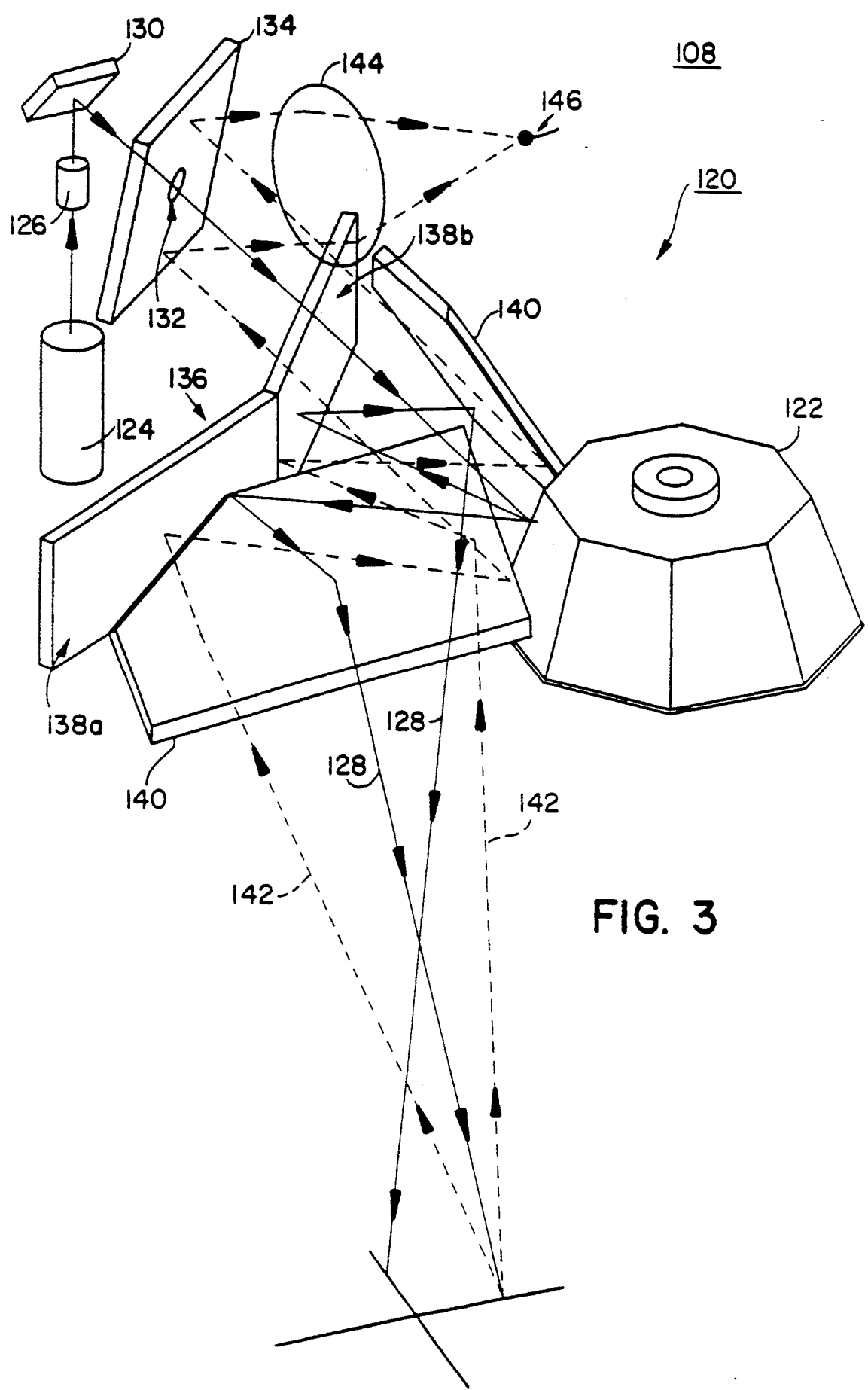
FIG. 3 is a schematic perspective diagram of the interrelating parts of the light source and sensing means that may be used in one embodiment of the present invention.

As shown in FIG. 3, an optics means 108, includes a coherent light source and sensing assembly 120 and a rotating mirrored polygon 122. The mirrored polygon 122 preferably has eight reflective sides or facets and is rotated by a brushless DC motor (not shown). The speed of the motor determines the scan or sweep speed of the incident coherent light 128 illuminating the bar code.

The optics means 108 preferably includes two or more coherent light source and sensing assemblies 120. By appropriate positioning of the coherent light and source and sensing assemblies 120 in the optics means 108, the polygon 122 can be used to sweep the light from each source and sensing assembly 120. The number of source and sensing assemblies 120 depends upon the resolution of bar elements desired and the scan pattern to be used. For example, if four source and sensing assemblies 120 are used, the optics means can scan 15 mil and larger bars whereas an optics means with two source and sensing assemblies can scan 20 mil and larger bars.

The source and sensing assembly 120 includes a coherent light source 124 such as a laser diode which emits light of 670 nanometers. The light from the source 124 is focused by a lens assembly 126 so the incident light 128 is focused at a predetermined focal plane. In this way, a bar of a prespecified width is optimally illuminated at some distance above or below this plane. The distance that a bar is optimally illuminated, or is in focus, has been commonly referred to as the depth of field for a scanning device. The light exiting the lens assembly 126, is reflected by the bounce mirror 130 through an aperture 132 in the center of the return mirror 134 to the rotating polygon 122. For clarity, the incident light 128 is depicted as a solid line and the return light 142 (i.e., light reflected by the bar code) as a dashed line.

The incident light 128 from the bounce mirror is reflected by one of the reflective sides of the rotating polygon 122 and redirected to the splitter mirror 136, having two mirrored faces 138a,b. The faces 138a,b form an obtuse angle facing the polygon 122. Rotation of the polygon 122 sweeps the coherent light across the peak of the splitter mirror 136 between the faces 138a,b, such that the light is reflected left or right from the splitter mirror. The light reflected from the splitter mirror 136 is then reflected by one of the alignment mirrors 140 depending upon which direction the light is reflected from the splitter mirror 136. Depending upon the direction taken by the light reflected by splitter mirror 136, one or more of the branches of an "X" scan pattern is produced on the bar code.

The return light 142 is representative of the dark and light areas of the bar code illuminated by the sweeping incident light 128. The return light 142 from the bar code is reflected by the splitter mirror 136, the alignment mirrors 140 and the rotating polygon 122, to return mirror 134. The return light 142 is then reflected by the return mirror 134 to a second lens assembly 144 which focuses the return light 142 onto a sensor 146. The sensor 146 may be a photodiode, however, it may be any device known in the art which can sense light intensity and provide an output signal representative thereof. The output from the sensor 146 is amplified by a preamplifier (not shown) and a digitized by a digitizer board (not shown) before it is transmitted over line 112 (shown in FIG. 2) to the electronics means 110 (shown in FIG. 2) for processing and decoding.

Figure 4:
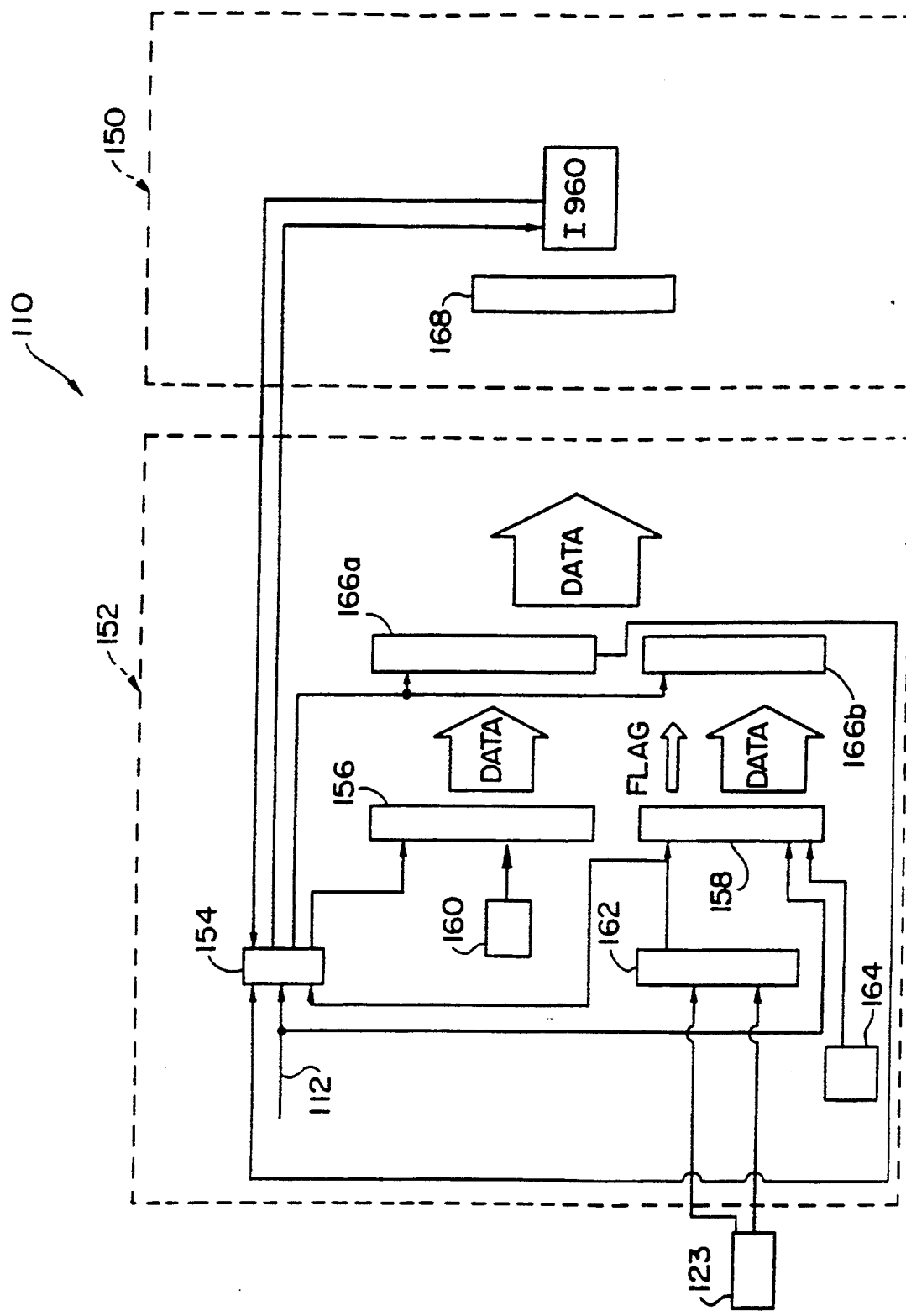
FIG. 4 is a schematic block diagram of the data processing and signal processing means that may be used in one embodiment of the present invention.

As shown in FIG. 4, electronics means 110 has two parts; a data microprocessor 150 and an optical signal processor 152. The signal processor 152 receives the digitized representation of the reflected light signal from the optics means sensor 146, FIG. 3, and processes it such that data representative of the light and dark is provided to the data microprocessor 150. The data microprocessor 150 takes the data as it is received and processes it, as explained further below, to reconstruct the scanned bar code. Once the bar code is reconstructed, the microprocessor 150 decodes the bar code and outputs the decoded information to a controller board (not shown).

The signal processor 152 includes a programmable array logic (PAL) 154, a transition counter 156, a position counter 158, a system clock 160, a sweep counter 162, a position clock 164, and two first-in/first-out (FIFO) buffers 166a,b. The optics means output signal is provided over line 112 (FIG. 3) to both the PAL 154 and the position counter 158.

The position clock 164 is provided to the position counter 158. The position counter outputs position data on every bar and space in the scan to the FIFO buffer 166b. The position counter also outputs to the FIFO buffer 166b a flag which indicates whether the data contained in the other buffer 166a, associated with the data from the position counter, is either a bar or a space (i.e., a black or white flag).

The polygon drive motor 123 provides encoder pulses and a home pulse to the sweep counter 162. The sweep counter 162 outputs an end of sweep signal to PAL 154 and to counter 158 so new data from another sweep can be accumulated. The home pulse is used to synchronize the sweep count with the beginning of the sweep pattern.

The transition counter 156, using input from the system clock 160 and the PAL 154, outputs width data for each bar and space to the FIFO buffer 166a. The PAL 154 provides an output signal to the transition counter 156 to reset the transition counter 156 after each transition.

The FIFO buffers 166a,b store corresponding width and position data until it can be sent to the microprocessor 150 for further evaluation and processing. When the microprocessor 150 wants another batch of data, the PAL 154 is directed to transfer data from the FIFO buffers 166a,b to the microprocessor 150. In the present invention, data is transferred directly to the microprocessor memory 168 from the FIFO buffers 166a,b. The amount of information in the FIFO buffers at any time is dependent upon the processing speed of the microprocessor 150 and the number of bar codes being read by the optics means 108.

The foregoing description of the signal processor 152 has been provided for illustrative purposes, as there are other techniques and equipment known in the art which can be used to output a signal representative of light and dark areas of a bar code and their respective positions to a microprocessor.

Figure 5:
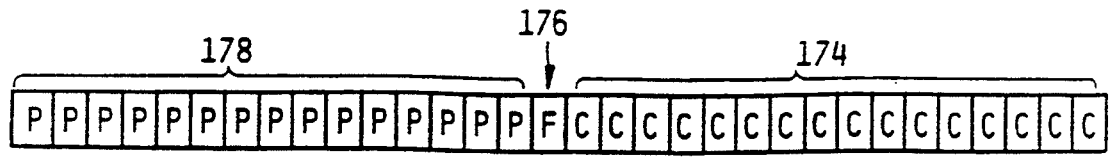
FIG. 5 shows the data format used in one embodiment of the signal processor of the present invention.

FIG. 5 illustrates the data output 172 from the signal processor to the data microprocessor. The bits in the first fifteen fields, in the first region 174, reflect the count of bars or spaces (i.e., width data). The bit in the sixteenth field, in the second region 176, indicates whether the data in the first fifteen fields is for a bar or space. The remaining fields, the third region 178, contain bits representative of the position of the bar or space from the beginning of the sweep.

Figure 6:
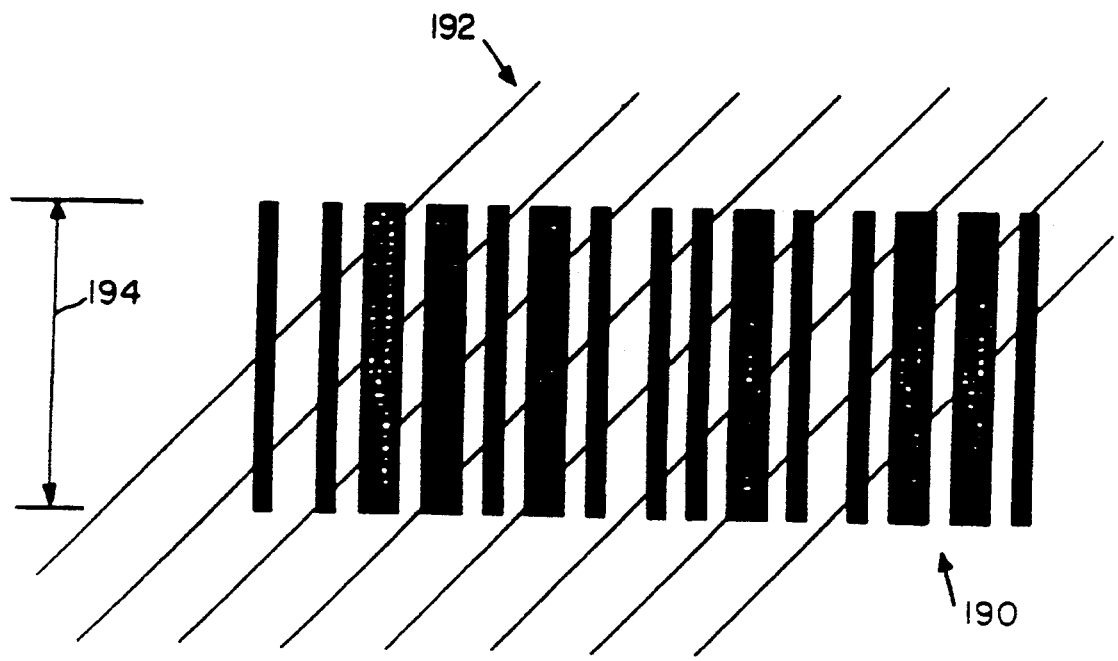
FIG. 6 is a plan diagram which shows successive scans across a bar code.
Figure 7A:
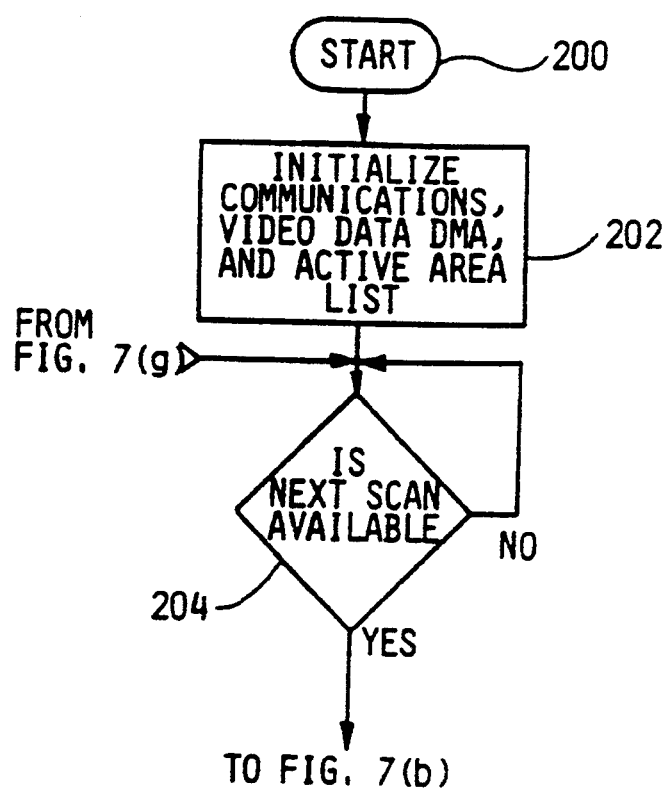
Figure 7C:
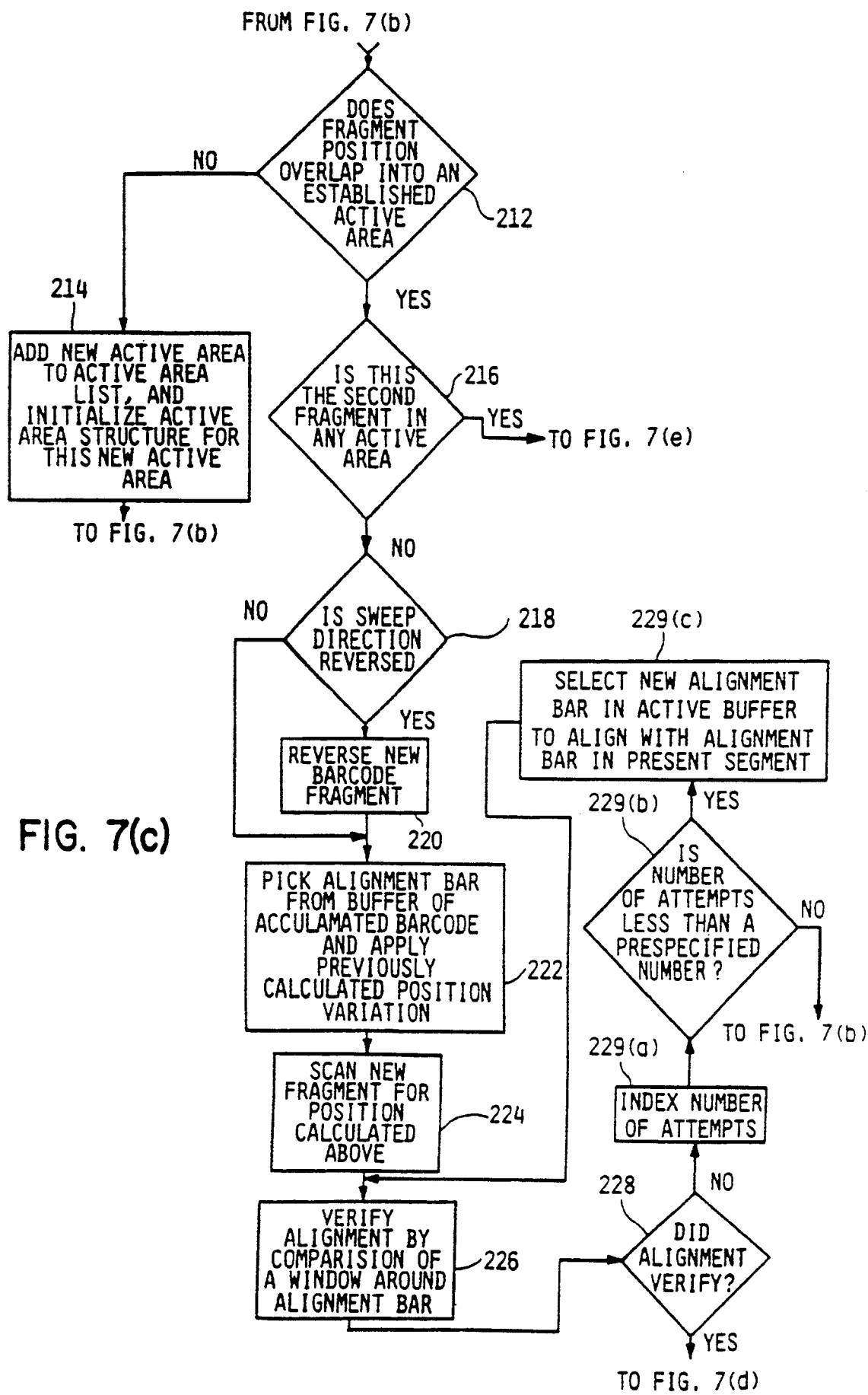
Figure 7D:
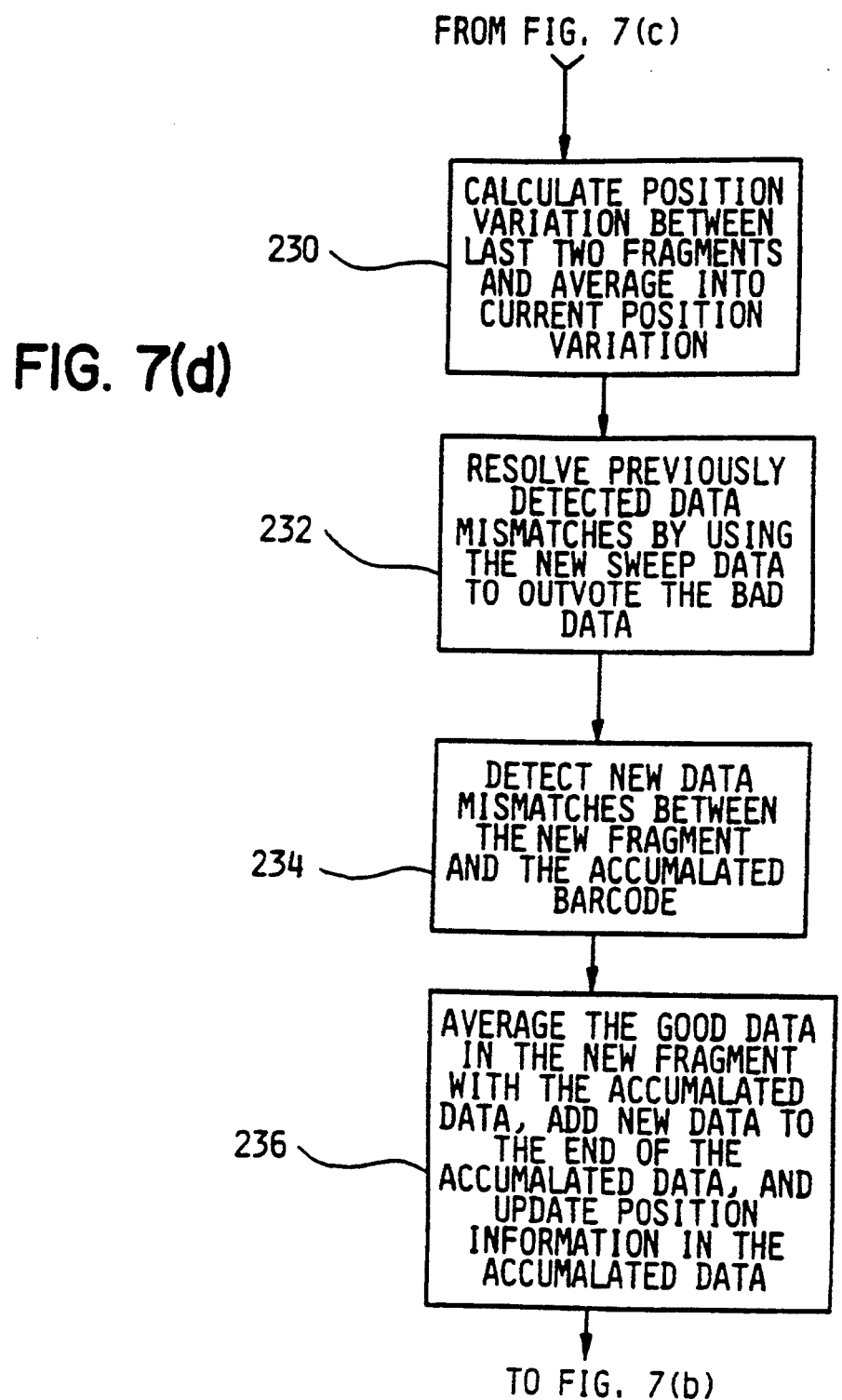
Figure 7E:
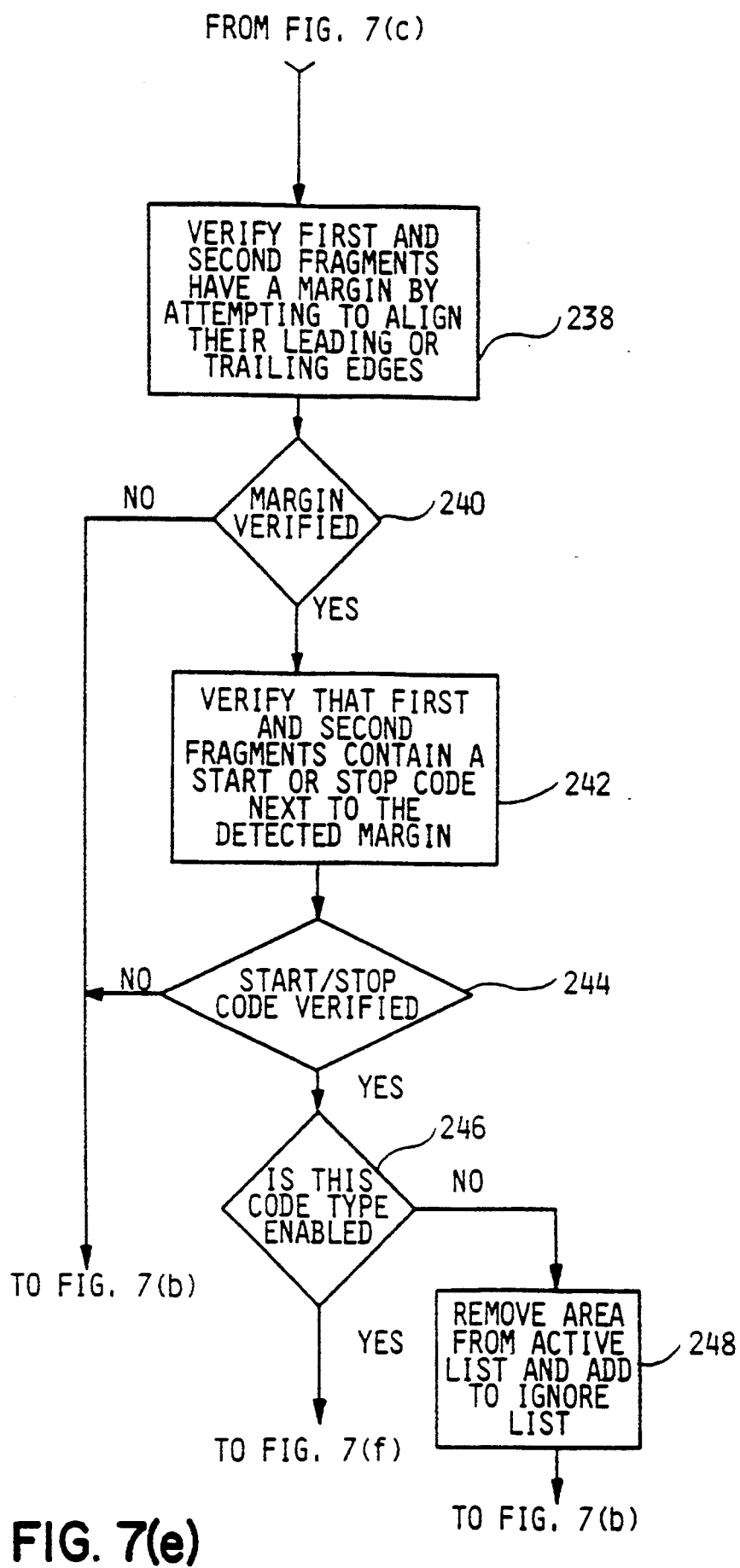
Figure 7F:
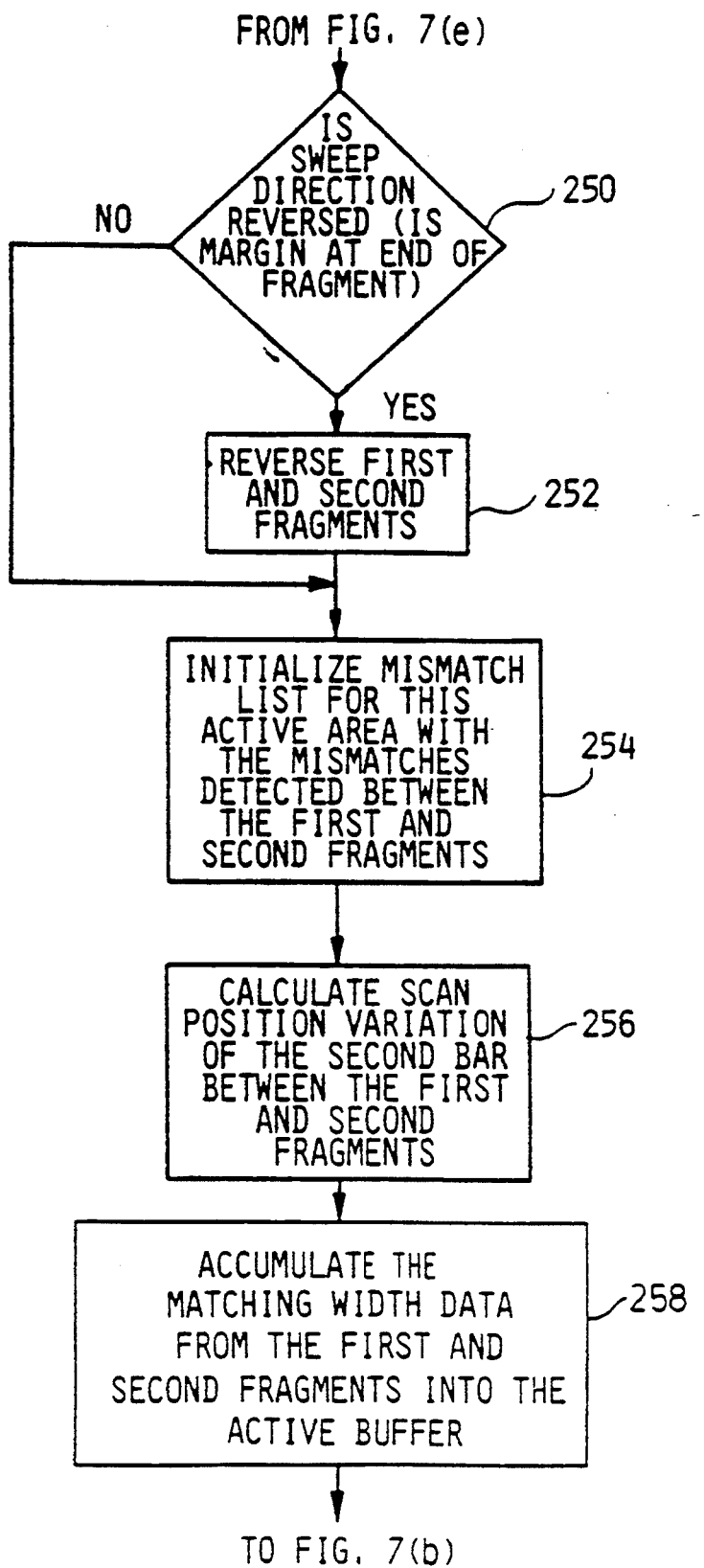
Figure 7G:
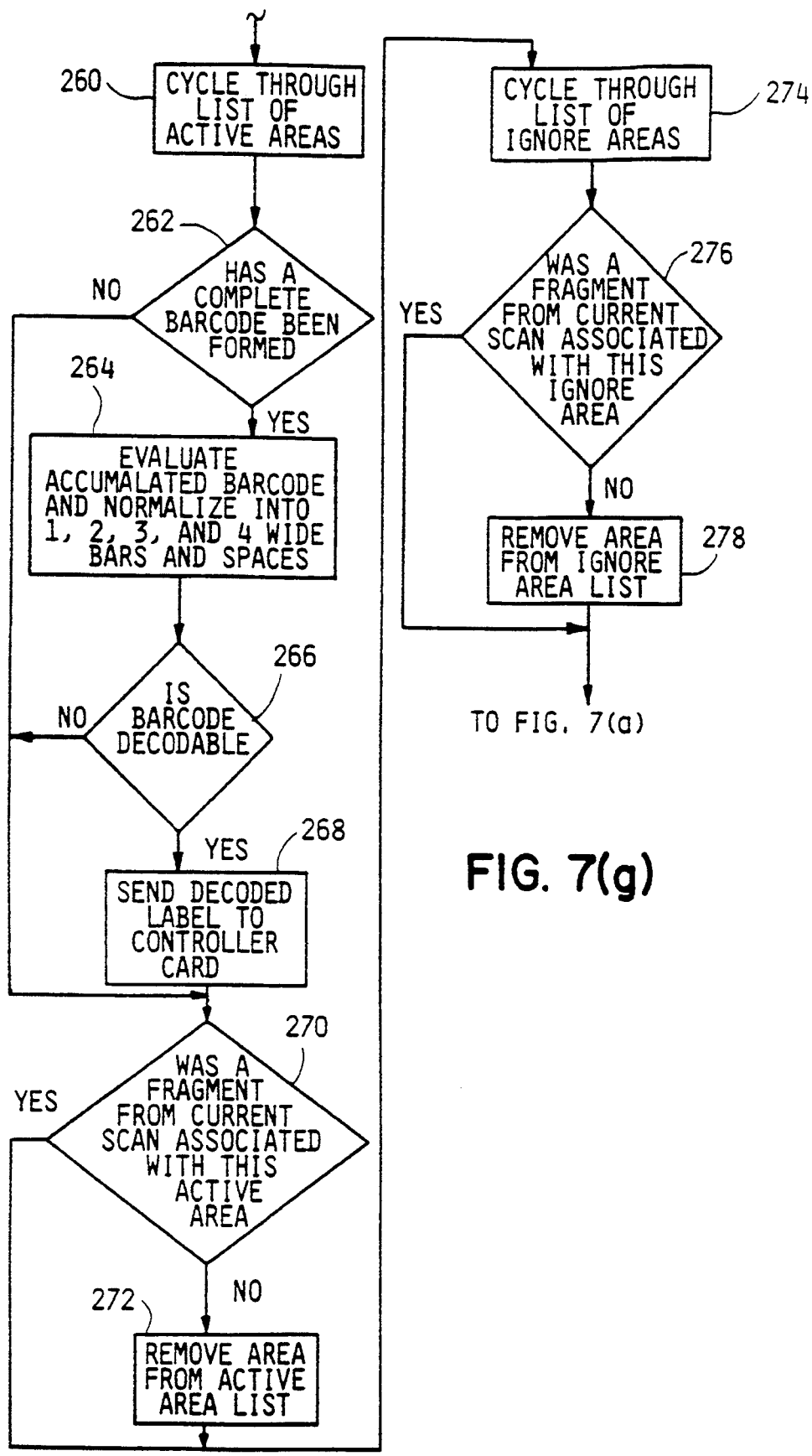

As shown in FIG. 6, when a bar code 190 moves under a scanner at an angle to the scan line, the bar will be swept with a number of coherent light beams 192. Each beam 192 will intersect different regions of the bar code where each region represents a segment of the bar code. As can be seen from FIG. 6, the sweeps of the bar code segments overlap. In addition to intersecting different regions, the coherent light beams 192 also intersect the same bar code element at different points. The actual number of sweeps of a bar code is dependent upon the speed at which the bar moves under the scanner and the height 194 of the bar code.

It is a reasonable assumption, particularly for conveyer belt applications, that each bar code 190, as it passes under the scanner, maintains a fixed angle relative to the scanner's scan line and the bar code velocity remains effectively constant. If the bar code maintains a fixed angle and a constant speed, data will appear to move along the scan line at a constant rate. Thus, the points at which the different sweeps of coherent light intersect a bar code element are spaced equidistant.

The reconstruction methodology of the present invention takes advantage of the constant rate of movement to overlay the codes segments in their correct alignment. Whether a margin is leading or trailing depends on the sweep direction. Either margin is intersected by at least the first two sweeps of coherent light from the scanner. The code segments from the first two scans are aligned by using the margin. If the margins are not aligned with the use of the leading edges, then another attempt to align is performed with the use of the trailing edges. Next, a bar is selected and the distance that the bar appears to move along the scan line between the first two sweeps is determined. This distance information is used to calculate an offset to align the code segments of the subsequent sweeps. This calculated offset is further refined by using positional information from subsequent sweeps. The third and successive scans are subsequently aligned with the previous scans based upon the refined calculated offset. An alignment verification is performed to ensure the alignment of the previous scan and the present scan. If, however, the alignment is not proper, additional alignments are attempted.

Data width mismatches between the first two sweeps are identified by comparing the position aligned segments to see if there is an inconsistency in the width values for the bars and spaces. These mismatches are resolved by comparing the data from the third sweep with data from the first two sweeps. If there are two good data widths, the third is ignored as being bad data. Once the bar code width data has been completely assembled, the bar code is normalized into the four possible widths and decoded just as though the bar code had been scanned in the traditional method (i.e., scanned in it's entirety).

The benefits of this methodology include making full use of all redundant bar and space information. This procedure avoids the uncertainties inherent in pattern matching techniques, and it automatically eliminates human readable information. As indicated above, redundant bar and space information is required for reconstructive methodologies to assure the correct determination of bar and space widths for decoding. Human readable information, such as printed letters and numbers, are non-linear entities which will not align correctly, and will remain unresolved mismatches. As such, it is automatically excluded from the accumulated bar code data of the present invention.

The methodology of the present invention does not require checksums or fixed length checks of the decoded bar code. In this way, bar codes can be decoded faster and there is no dependency upon knowing in advance which bar codes are to be scanned. In addition, the scanning device of the present invention can reliably read bar codes which are smaller (i.e., have a smaller aspect ratio) than those used previously.

There is shown in FIGS. 7(a)–7(g), a flow chart of the sequence of operations for the data microprocessor 150 (FIG. 4) to positionally align the code segments for reconstruction, resolve width mismatches, combine sweep data, and to decode the bar code after it has been completely reconstructed. It should be recognized, when reading the following, that either end of the bar code may be seen first by the scanning device's sweeping coherent light.

While the flow-chart is best explained by describing the sequence of operations as if a single bar code is being read and decoded at a time, the scanning device of the present invention can scan and read a plurality of bar codes at the same time. The scanning device also can decode one bar code while simultaneously accumulating data for other bar codes.

At the start of the process, step 200, the counters and other parameters are initialized, step 202. Following the start and initializing of parameters, steps 200,202, the scanning device is in continuous operation. Thus, while the process may "end" as it pertains to an individual bar code, the device and its operations continue to operate automatically (i.e., there is no end to the flow chart).

After initializing, step 202, the video data DMA status is evaluated to determine if a scan or next scan is available, step 204. If a scan or next scan is not available (NO), step 204 is repeated until a scan is available.

When a scan is available (YES), step 204, the raw data is then evaluated to see if there is a possible bar code segment in the data. This process starts at the beginning of the scan or the end of the last identified segment, step 206. First, the raw data is evaluated to find the next group of transitions where each transition in the group is less than a preset maximum bar/space and greater than a preset minimum bar/space. Next, the group of transitions found is checked for any adjacent pairs which have a ratio of greater than six to one or less than one to sixs (i.e. for a true bar code margin typically white divided by black is greater than ten to one). This helps to further segment the data and the first group of transitions found becomes the present segment. Before further processing, the code segment is reduced, if necessary, such that it always starts and ends with a bar. During all of the processing for finding bar code segments, the transition group must have greater than a preset number of transitions to remain under consideration. The segment found will, hereinafter, be referred to as the present segment unless reference is being made to particular sweeps.

If a segment is found (YES), step 208, then it is evaluated to see if the segment position overlaps into an established ignore area, step 210. If a segment is not found (NO), step 208, then the process begins to cycle through the list of active areas, step 260. When reading multiple bar codes simultaneously, the segment found will be associated with a known active acrea or will initiate a new active area. Active areas are those regions of the item that pass under a scan line containing a bar code the user wants decoded. Ignore areas are those regions containing bar codes that the user does not want to decode.

The present segment is next evaluated for overlap into an ignore area, step 210, by comparing the start and end positions of the segment with known areas that are ignored (see steps 246,248). If the present segment, or a portion thereof, is found to overlap an ignore area, a match is found and the process returns back to step 206, to identify further possible bar code segments.

If the present segment does not overlap an ignore area (NO), step 210, the segment is then evaluated to see if it overlaps an established active area, step 212. This is done by comparing the segment start and end positions with the known active areas. If the position of the data for the present segment is found to be located completely or partially in an active area, the segment overlaps the active area and a match is found.

If an active area overlap match is not found (NO), step 212, then the active area list (i.e., active data files) is updated, step 214. In this step a new active area structure, including associated address pointers, is created by using information from the present segment to identify a new active area. Once the active area list is updated, the process returns to step 206, to identify further possible bar code fragments.

If an active area overlap match is found (YES), step 212, the present segment is evaluated to determine if it is the second segment, step 216. If the present segment is the second segment (YES), then the process continues by attempting to align the leading and trailing edges of the first and second segments, step 238. If the present segment is not the second segment (NO), the sweep direction from the active area structure is evaluated to see if it is reversed, step 218.

Since a bar code 190 can approach the scan line 192 at any angle, and since there may be multiple bar codes being read on a single item, it is quite likely that bar codes will be oriented so that one is being scanned trailing edge first and another leading edge first. The first and second segments are compared with the leading edge lined up and then with the trailing edge line up, step 238. The sweep direction (i.e., forward or reverse) is established by determining which comparison, leading edge or trailing edge, has the least amount of mismatches. The sweep direction is also retained, in the active area structure, so it can be used to identify the sweep direction for future sweeps of the active area.

The true barcode quiet-zone margins are verified by the margin verification test. The margins are not considered verified if the segments do not compare to within a preset mismatch limit when the edges are aligned. If the existence of margins cannot be verified (NO), step 240, then the process returns to step 206, to identify possible bar code segments.

If margins are found (YES), step 240, then the data segments are reviewed to determine if a valid start code or a valid stop code is next to the verified margin, step 244. If no valid start or stop code is found next to the margin (NO), then the process returns to step 206, to identify possible bar code segments.

If a valid start or stop code is found (YES), step 244, then a determination is made whether the code is one of the symbologies the user is interested in having decoded, step 246. It is not unusual for an item to have a number of bar code labels affixed to its exposed surfaces. As such it is desirous to have the bar code scanner automatically suppress extraneous bar codes so time and money is not wasted trying to accumulate unwanted information.

If the bar code symbology is one of the ones the user is not interested in (NO), step 246, the area is removed from the active area listing and added to the ignore area list, step 248. In this way, future scans containing the unwanted bar code will be automatically eliminated early in the process when a present segment is evaluated for overlap into an ignore area, step 210.

If the bar code symbology is one of the types the user is interested in (YES) step 246, then the already established sweep direction for both the first and second sweeps is reviewed to determine if the sweep direction is reversed, step 250. If the sweep direction is reversed (YES), then the data for the first and second segments is reversed, step 252. This orders the first and second data for future evaluation and processing.

After reversing the data, step 252, or if the sweep direction is not reversed (NO), step 250, the mismatches between the aligned first and second segments as identified in step 238 are stored in a mismatch array, step 254. Each bar and space of the aligned segments are compared to identify bars and spaces which have inconsistent widths (i.e., width mismatches). The mismatched bars and spaces are identified and the associated data, from both the first and second segments, is stored in a mismatch array. The mismatched bar elements are identified so the associated data is not accumulated until the mismatch has been resolved. Concurrently a review is made to determine how many sweeps a bar has been seen in. The number of sweeps seen, for each bar, is stored in the active area structure (i.e., the sweeps per bar array). This information is used later for alignment purposes.

The positional difference between the position of the second bar in the first sweep and the position of the second bar in the second sweep is calculated, step 256. The calculated difference is used to determine the positional location of a bar in future sweeps, as explained below, and to calculate any further offset values for sweep alignment. The alignment of the first and second sweeps was determined by the margin verification, step 240.

The data for each present segment is maintained in a sweep buffer until it is copied into the active buffer for accumulation of the bar code. After calculating the positional difference, the good width data for the first and second sweeps is added to the active buffer, step 258. In this respect, adding to the active buffer means combining the width data for overlapping bars and spaces to yield an average width value, and appending data not found in the first sweep, but found in the second sweep. After calculating the difference, step 256, and adding the count information to the active buffer, step 258, the process returns to step 206, to identify possible bar code segments.

By returning to step 206, more bar code segments, if present in the current sweep of data, will be processed. However, this active area will not process until the next sweep, at which time it will be the third sweep for this active area, and processing will proceed to step 218.

As indicated above (see step 250), the sweep direction for segments in a known active area is retained for future use. Thus, for the third and subsequent segments of a known active area the sweep direction is determined by making reference to the retained information. Therefore, after acquiring a third or subsequent segment (i.e., going through steps 206–216), the active area structure is reviewed to determine the sweep direction, step 218. If the sweep direction is reversed (YES), the width data for the present segment is reversed or flipped for further evaluation and processing, step 220.

After reversing the data, step 220, or if the direction for the present segment is not reversed (NO), step 218, an alignment bar is selected from the active buffer and the previously calculated position offset is applied, step 222. An alignment bar is selected by searching the active buffer, starting at the end of the buffer, until a bar (not a space) is found which has been seen in at least 2 sweeps. Since mismatched data is not added to the active buffer, the selected bar is known to be a valid bar of the bar code. The previously calculated position offset is subtracted from the position of the alignment bar.

The previously calculated offset is the difference calculated in step 256 when the present segment is the third segment for a given active area. Thereafter, the previously calculated offset is that determined from step 230 described below.

Since the bar code is assumed to maintain a fixed angle relative to the scanner's scan line and a constant velocity through the scanner, the previously calculated offset represents the expected offset of the alignment bar along the scan line from the bar's position in the active buffer to the bar's position in the present segment. As a result, combining the offset with the alignment bar position yields the expected position of the alignment bar in the next sweep.

The present segment is scanned for the expected position of the alignment bar, step 224. In this step the present segment is searched, beginning at the front end of the data, to find the position of the bar which most closely matches the expected position of the bar established by the calculation in step 222. After identifying the bar in the present segment, the difference between the bar's position in the present segment and the calculated position is determined.

A window is set about the alignment bar to compare width data of the active buffer and the present segment to verify the positional alignment of the present segment with the active buffer, step 226. Beginning at the front edge of the window, five transitions (bars/spaces) are compared. The width values of the bars and spaces in the active buffer are compared with the width values of the corresponding bars and spaces in the present segment to determine if the width values are consistent. If the number of identified inconsistencies determined is less than a prespecified value, the positional alignment between the active buffer and the present segment is considered acceptable (i.e., verified) (YES), step 228. If an unacceptable number of inconsistencies is determined, alignment is not verified (NO) and the process continues to step 229(a).

In a preferred embodiment, a maximum of four additional attempts are performed to place the present segment in alignment with the active buffer, steps 229(a) and 229(b). Specifically, the alignment bar of the present segment is compared with the bar to the left of the alignment bar in the active buffer, step 229(c). An alignment verification is performed, as described above, to ensure the alignment of the present segment and the adjacent transition in the active buffer, step 226. If the number of identified inconsistencies determined is less than a prespecified value, the positional alignment between the active buffer and the present segment is verified, step 228. If an unacceptable number of inconsistencies is determined, alignment is not verified (NO) and the process continues to step 229(a).

If the alignment of the present segment and the active buffer is not verified, then a maximum of three additional attempts are performed to place the present segment in alignment with the active buffer. Specifically, the alignment bar of the present segment is compared with the bar to the right adjacent transition of the alignment bar in the active buffer. An alignment verification is performed, as described above, to ensure the alignment of the present segment and the active buffer. If the number of identified inconsistencies determined is less than a prespecified value, the positional alignment between the active buffer and the present segment is verified. If an unacceptable number of inconsistencies is determined, alignment is not verified (NO) and the process continues to step 229(a).

If the alignment of the present segment and the active buffer is not verified, then a maximum of two additional attempts are performed to place the present segment in alignment with the active buffer. Specifically, the alignment bar of the present segment is compared with the second bar to the left of the alignment bar in the active buffer. An alignment verification is performed, as described above, to ensure the alignment of the present segment and the active buffer. If the number of identified inconsistencies determined is less than a prespecified value, the positional alignment between the active buffer and the present segment is verified. If an unacceptable number of inconsistencies is determined, alignment is not verified (NO) and the process continues to step 229(a).

If the alignment of the present segment and the active buffer is not verified, then one additional attempt is performed to place the present segment in alignment with the active buffer. Specifically, the alignment bar of the present segment is compared with the second bar to the right of the alignment bar in the active buffer. An alignment verification is performed, as described above, to ensure the alignment of the present segment and the active buffer. If the number of identified inconsistencies determined is less than a prespecified value, the positional alignment between the active buffer and the present segment is verified. If an unacceptable number of inconsistencies is determined, alignment is not verified (NO) and the process continues to step 206, to identify possible new bar code segments. No further transitions are compared, and the present segment is eliminated from further processing.

The number of alignment attempts made is matched to the system position accuracy and the apparent size of the smallest valid bar at the bottom of the depth-of-field. The system position accuracy is dependent on the position encoder, the drive motor, and the polygon's inaccuracies, and any corrections or calibrations for these inaccuracies. In a preferred embodiment, the cost of precise encoders, motors, and polygons is weighed against the need for reconstruction accuracy. The preferred embodiment's maximum of five total alignment attempts is based on the character size of most bar code symbologies (i.e. ten bars/spaces per Code 39 character). However, alternative embodiments could use more precise system components and only allow one alignment attempt or use less precise system components and allow more alignment attempts as necessary. Increasing the number of alignment attempts allowed will increase the likelihood of bar code mis-reconstruction.

If the alignment is verified (YES), step 228, an average offset value is then calculated, step 230. The average offset value is established by determining the positional variation between the alignment bar in the present segment and the active buffer. This difference is averaged into the previously calculated position offset to yield a current position variation or offset. This current position offset is then used for subsequent sweeps in a similar manner as the previously calculated offset was used in step 222.

Using the data from the third segment, data matches between the first and second segments are resolved by using the new data to out vote the bad data, step 232. Specifically, the width data for the first and third segments and width data for the second and third segments, associated with the mismatched bars and spaces, is compared to identify which segment pair (e.g., first and third segments) has consistent data. This data pair is then used to determine which data from the first and second segments shall be ignored (i.e., bad data is out voted by the matched segment pair). This evaluation is made for each of the identified mismatches.

The active buffer and the present data segment are reviewed to determine if there are any new mismatches, step 234. The new and active data are compared to see if there are any width values for bar or spaces which appear inconsistent. After reviewing the data, any new mismatches are identified and stored in the mismatch array for future resolution.

After updating the active data files to reflect the good information, the process returns to step 206, to identify possible bar code segments. The process between step 206 and step 236 is repeated for an active area until its bar code passes out from under the scan line of coherent light. While a minimum of three scans are needed to resolve mismatches, step 232, there should preferably be 4 scans of the bar code before it passes out from under the scan line.

When a present segment is not found, step 208, the list of active areas is cycled through to perform a set or series of actions (i.e., steps 260-272). The list of ignore areas is also cycled through to perform another set or series of actions (i.e., steps 274-278). Both are done to determine if an active or ignore area has passed out from under the scan line; so that the reconstructed bar code is decoded; and/or the active area list updated to remove unneeded data. After either or both sets of actions are completed, the process returns to step 204, to determine if another scan or sweep of data is available.

The active areas are cycled through, step 260, to determine if a completed bar code has been formed, step 262, to normalize data if a complete code has been formed, step 264, decoding the bar code and outputting the decoded information, steps 266, 268, and removing data from the active area list after the active buffer has been decoded, steps 270-272. To decode the information the width data accumulated is processed to normalize the data into 1, 2, 3, and 4 wide bars and spaces, an industry standard practice, step 264.

After cycling through the active areas, the ignore areas are then cycled through to determine if an ignore area has passed out from underneath the scan line, step 276, and if yes, the data associated with this ignore area is removed from the data structure, step 278.

While a preferred embodiment of the invention has been described using specific terms, such description is for illustrative purposes only, and it is to be understood that changes and variations may be made without departing from the spirit or scope of the following claims.

What is claimed is:

1. A device for reading machine readable code, comprising:
   (a) scanning means for successively scanning the code and for outputting a signal representative of at least a portion of the code, for each successive scan of the code;
   (b) signal processing means for processing each of said signals outputted by said scanning means, said signal processing means further providing signal identification data, including a width and position associated with each of said signals, for each successive scan of the code; and
   (c) data processing means for reconstructing the code from said signal identification data for each successive scan of the code provided by said signal processing means, said data processing means also comprising, (i) position aligning means for positionally aligning succeeding scans, wherein said position aligning means comprising,
   means for selecting an element in a previous scan,
   means for calculating the position of that element in a successive scan based upon a calculated offset, said calculated offset determined by an offset calculating means which calculates the difference in position of features in previous scans, and
   means for aligning said successive scan with said previous scan by means of said calculated offset by placing said selected element in said successive scan in alignment with said selected element in said previous scan, and
   (ii) alignment verification means for verifying the alignment between said previous scan and said successive scan performed as a result of said means for aligning, wherein said alignment verification means further comprises means for attempting a predetermined number of additional alignments between said previous scan and said successive scan when said previous scan and said successive scan are not aligned by said alignment verification means.

2. The device according to claim 1, in which said data processing means further comprises means for both combining and accumulating said signal identification data.

3. The device according to claim 2, in which said offset calculating means further comprises a first offset calculating means for calculating a positional difference between the position of a selected code element in a first scan of a code, from said combining and accumulating means, and the position of the selected code element in a second scan of the code to provide said calculated offset for determining the expected position of the selected code element in the successive scan.

4. The device according to claim 3, wherein said alignment verification means further comprises a first verifying means for verifying the alignment between the first scan and the second scan based upon an occurrence of a predetermined number of mismatches when an alignment of leading edge margins of both the first and second scans is performed.

5. The device according to claim 4, wherein said means for attempting a predetermined number of additional alignments of said alignment verification means comprises a first attempt means for attempting to align the first scan with said second scan by comparing trailing edge margins of both the first and second scans.

6. The device according to claim 5 in which said offset calculating means further comprises:
a second offset calculating means for calculating a positional difference between the position of a selected code element from a previous scan from said combining and accumulating means and the position of said selected code element from a successive scan to provide said calculated offset for determining the expected position of the selected code element in the successive scan.

7. The device according to claim 6 in which said position aligning means further comprises an offset averaging means for averaging said calculated offsets for previous scans with the calculated offset determined by said second offset calculating means to provide a refined calculated offset for determining the expected position of the selected code element in the successive scan.

8. The device according to claim 7 in which said position aligning means further comprises means for locating a code element in a scan which most closely matches the expected position of the selected code element in said scan by means of said calculated offset determined by said first offset calculating means, said second offset calculating means or said offset averaging means.

9. The device according to claim 8, in which said data processing means further comprises means for determining the number of scans in which a code element has been seen.

10. The device according to claim 9, wherein said alignment verification means further comprises a second verifying means for verifying the alignment between a previous scan and said successive scan by comparing width data of a predetermined number of transitions in said previous scan and corresponding transitions in said successive scan.

11. The device according to claim 10, wherein said means for attempting additional alignments of said alignment verification means comprises a second attempt means for attempting to align a previous scan with a successive scan by comparing a bar proximate to an alignment bar of said successive scan with said alignment bar of said previous scan, and repeating this step for a predetermined number of additional bars proximate to said alignment bar of said successive scan provided said previous scan and said successive scan are not aligned.

12. The device according to claim 11, in which said data processing means further comprises:
means for positionally aligning said signal identification data in said combining and accumulating means with the signal identification data of a successive scan by means of said calculated offset by placing said selected element in said successive scan in alignment with said selected element in said previous scan;
means for identifying width mismatches between aligned signal identification data, where said combining and accumulating means cooperates with said mismatch identifying means such that mismatched signal identification data is not combined and accumulated; and
means for retaining said signal identification data, from said signal processing means, identified as having width mismatches.

13. The device according to claim 12, in which said data processing means further comprises means for resolving identified width mismatches, identified by said mismatch identifying means, by comparing width data from three scans of signal identification data.

14. The device according to claim 13, wherein said mismatch resolving means compares the width data for corresponding code elements in the first scan with width data from the third scan to determine if the corresponding widths are consistent and compares the width data for corresponding code elements in the second and third scans to determine if the corresponding widths are consistent.

15. The device according to claim 14, in which said mismatch resolving means further comprises means for indicating that the signal identification data for the scans having consistent widths is to be combined in the combining and accumulating means and that signal identification data for the other scan is to be ignored.

16. The device according to claim 15 in which said data processing means further comprises:
scan direction means for determining the direction of a scan; and
data reversing means, responsive to said scan direction means, for reversing the signal identification data for each code element in each scan for a bar code such that the signal identification data for all scans of the bar code is maintained in a predetermined direction.

17. The device according to claim 16, in which said data processing means further comprises:
means for identifying a first area for which signal identification data is to be accumulated; and
means for identifying a second area for which signal identification data is not to be accumulated.

18. The device according to claim 17 in which said data processing means further comprises a first means for comparing the signal identification data for each scan, from said signal processing means, to determine if the signal identification data overlaps said first area.

19. The device according to claim 18 in which said data processing means further comprises a second means for comparing the signal identification data for each scan, from said signal processing means, to determine if the data overlaps said second area.

20. The device according to claim 19, wherein said means for identifying a second area identifies areas containing machine readable code that is not to be decoded.

21. The device according to claim 20 wherein said elements comprise a plurality of intervals including bars and spaces of either narrow or wide interval widths and in which said data processing means further comprises:
means for measuring the interval widths of said signal identification data, from said combining and accumulating means, and for normalizing the interval widths to 1,2,3, and 4 wide bars and spaces to provide a reconstructed bar code; and
means for decoding the reconstructed bar code to provide the encoded information.

22. The device according to claim 1, in which said scanning means further includes at least one light source and sensing means for successively illuminating a bar code with a predetermined pattern of light and successively sensing light reflected from the bar code.

23. The device according to claim 1, in which said scanning means further includes a plurality of light source and sensing means for successively illuminating a bar code with a predetermined pattern of light and successively sensing light reflected from the bar code.

24. The device according to claim 23, in which said light source and sensing means further includes a coherent light source.

25. The device according to claim 24, in which said scanning means further includes a light directing means for directing the light from said coherent light source to create the predetermined pattern of light.

26. A method for reading machine readable code, comprising the steps of:
 scanning the code to provide a signal representative of at least a portion of the code, and repeating scanning to obtain signals for additional portions of the code;
 successively processing each signal representative of the portion of the code obtained from each scan to provide signal identification data, including a width and position associated with each of said signals, for each successive scan of the code; and
 reconstructing the code from said signal identification data for each successive scan of the code, said reconstructing including the steps of:
 selecting an element in a previous scan;
 calculating the position of said element in a successive scan based upon a calculated offset, said calculated offset determined by the step of:
 calculating the difference in position of features in previous scans; and
 aligning said successive scan with said previous scan by means of said calculated offset by the step of:
 placing said selected element in said successive scan in alignment with said selected element in said previous scan;
 verifying the alignment between said previous scan and said successive scan performed as a result of step of aligning, wherein said step of verifying further comprises the step of:
 attempting a predetermined number of additional alignments between said previous scan and said successive scan when said previous scan and said successive scan are not aligned by said step of aligning.

27. The method according to claim 26, further comprising the steps of combining and accumulating said signal identification data.

28. The method according to claim 27, in which said step of calculating the position further comprises the step of:
 calculating a first positional difference between the position of a selected code element in a first scan of a code, from said step of combining and accumulating, and the position of said selected code element in a second scan of the code to provide said calculated offset for determining the expected position of the selected code element in the successive scan.

29. The method according to claim 28, wherein said step of verifying further comprises the step of:
 comparing leading edge margins of both the first and second scans to verify the alignment of the first and second scans based upon an occurrence of a preset amount of mismatches.

30. The method according to claim 29, wherein said step of attempting additional alignments of said step of verifying the alignment comprises the step of:
 comparing a trailing edge margins of both the first and second scans to attempt to align the first scan with said second scan.

31. The method according to claim 30, in which said step of calculating the position of a selected code element further comprises the step of:
 calculating a second positional difference between the position of a selected code element from a previous scan, from said step of combining and accumulating, and the position of said selected code element from a successive scan to provide said calculated offset for determining the expected position of the selected code element in the successive scan.

32. The method according to claim 31, in which said step of selecting and aligning further comprises the step of:
 averaging said calculated offsets for previous scans with the calculated offset from said step of calculating a positional difference to provide a refined calculated offset for determining the expected position of the selected code element in the successive scan.

33. The method according to claim 32, in which said reconstructing further comprises the step of:
 locating a code element in a scan which most closely matches the expected position of the selected code element in said scan by means of said first positional difference, said second positional difference or said refined calculated offset.

34. The method according to claim 33, in which said reconstructing further comprises the step of determining the number of scans in which a code element has been seen.

35. The method according to claim 34, in which said step of selecting further comprises the step of selecting a code element, from said combining and accumulating means, which has been seen in at least two scans.

36. The device according to claim 35, wherein said step of verifying the alignment further comprises the step of:
 comparing a second alignment of the width data of a predetermined number of transitions in said previous scan and corresponding transitions in said successive scan to verify the alignment between the previous scan and said successive scan.

37. The device according to claim 36, wherein said step of attempting additional alignments of said step of verifying the alignment comprises the step of:
 comparing a bar proximate to an alignment bar of said successive scan with said alignment bar of said previous scan to attempt to align said previous scan with said successive scan; and
 repeating said step of comparing for a predetermined number of additional bars proximate to said alignment bar of said successive scan when said previous scan and said successive scan are not aligned by said step of aligning.

38. The method according to claim 37, in which said reconstructing further comprises the steps of:
 positionally aligning said signal identification data in said step of combining and accumulating with the signal identification data of a successive scan by means of said calculated offset by placing said selected element in said successive scan in alignment with said selected element in said previous scan;

identifying mismatches of code element widths between aligned signal identification data, where said step of combining and accumulating cooperates with said identifying mismatches such that mismatched signal identification data is not combined and accumulated;

retaining said signal identification data which has been identified, from said identifying mismatches, as having width mismatches.

39. The method according to claim 38, in which said reconstructing further comprises the step of resolving identified width mismatches from said identifying mismatches identifying means, by comparing width data from three scans of signal identification data.

40. The method according to claim 39, wherein said resolving mismatches further compares the width data for corresponding code elements in the first scan with width data from the third scan to determine if the corresponding widths are consistent and compares the width data for corresponding code elements in the second and third scans to determine if the corresponding widths are consistent.

41. The method according to claim 40, in which said resolving mismatches further comprises the step of indicating that the signal identification data for the scans having consistent widths is to be combined in the combining and accumulating means and that signal identification data for the other scan is to be ignored.

42. The method according to claim 41, in which said reconstructing further comprises the steps of:

determining the direction of a scan; and reversing the signal identification data for each code element in each scan for a bar code in response to said determining the scan direction, such that the signal identification data for all scans of the bar code is maintained in a predetermined direction.

43. The method according to claim 42, in which said reconstructing further comprises the steps of:

identifying a first area for which signal identification data is to be accumulated; and identifying a second area for which signal identification data is not to be accumulated.

44. The method according to claim 43, in which said reconstructing further comprises the step of comparing the first area with the signal identification data for each scan, from said signal processing, to determine if the signal identification data overlaps said first area.

45. The method according to claim 44, in which said reconstructing further comprises the step of comparing the second area with the signal identification data for each scan, from said signal processing, to determine if the data overlaps said second area.

46. The method according to claim 45, wherein said step of comparing the second area further comprises identifying areas containing machine readable code that is not to be decoded.

47. The method according to claim 46, wherein the code elements comprise a plurality of intervals including bars and spaces of either narrow or wide interval widths and in which said reconstructing further comprises the steps of:

measuring the interval widths of said signal identification data, from said combining and accumulating means;

normalizing the interval widths from said measuring to 1,2,3, and 4 wide bars and spaces to provide a reconstructed bar code; and decoding the reconstructed bar code to provide the encoded information.

* * * * *